United States Patent

[11] 3,524,378

| [72] | Inventor | George L. Wieber |
| | | Mount Prospect, Illinois |
| [21] | Appl. No. | 781,444 |
| [22] | Filed | Dec. 5, 1968 |
| [45] | Patented | Aug. 18, 1970 |
| [73] | Assignee | Illinois Tool Works Inc. |
| | | Chicago, Illinois |
| | | a Corp. of Delaware |

[54] STITCHING SCREW
4 Claims, 5 Drawing Figs.

| [52] | U.S. Cl. | 85/47 |
| [51] | Int. Cl. | F16b 25/00 |
| [50] | Field of Search | 85/41, 46, 47, 1 Int., 1K |

[56] References Cited
UNITED STATES PATENTS

| 2,160,706 | 5/1939 | Olson | 85/47 |
| 2,172,258 | 9/1939 | Place | 85/46 |
| 2,479,730 | 8/1949 | Dewar | 85/47 |
| 2,761,347 | 9/1956 | McKee | 85/50 |
| 3,094,894 | 6/1963 | Broberg | 85/47 |

FOREIGN PATENTS

| 1,440,062 | 4/1965 | France | 85/46 |
| 176,091 | 4/1917 | Canada | 85/1(K)UX |

Primary Examiner— Marion Parsons, Jr.
Attorney— Robert W. Beart, Michael Kovac, Barry L. Clark and Jack R. Halvorsen ABSTRACT: A self-drilling stitching screw to pull together and secure relatively thin work sheets after successively drilling a hole in each sheet, and including a drill point extremity merging with a starting thread section above which is an unthreaded shank section serving as an idling, dwell or parking area for the upper sheet until the second or lower sheet moves up to join the upper sheet in that area at which time both sheets move up a second or upper holding thread section to final position with the clamping surface of the screw head engaged with the adjacent surface of the upper sheet; and wherein there may be provided an idling area immediately adjacent the clamping face of the screw head enabling the lower sheet to be more tightly drawn against the upper sheet in final position.

Patented Aug. 18, 1970
3,524,378
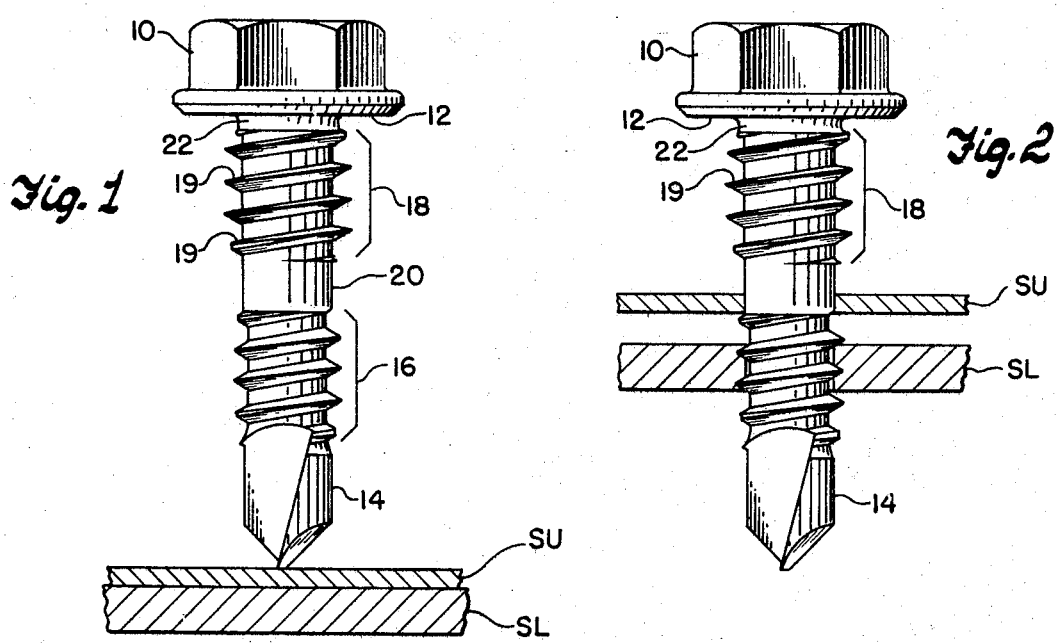
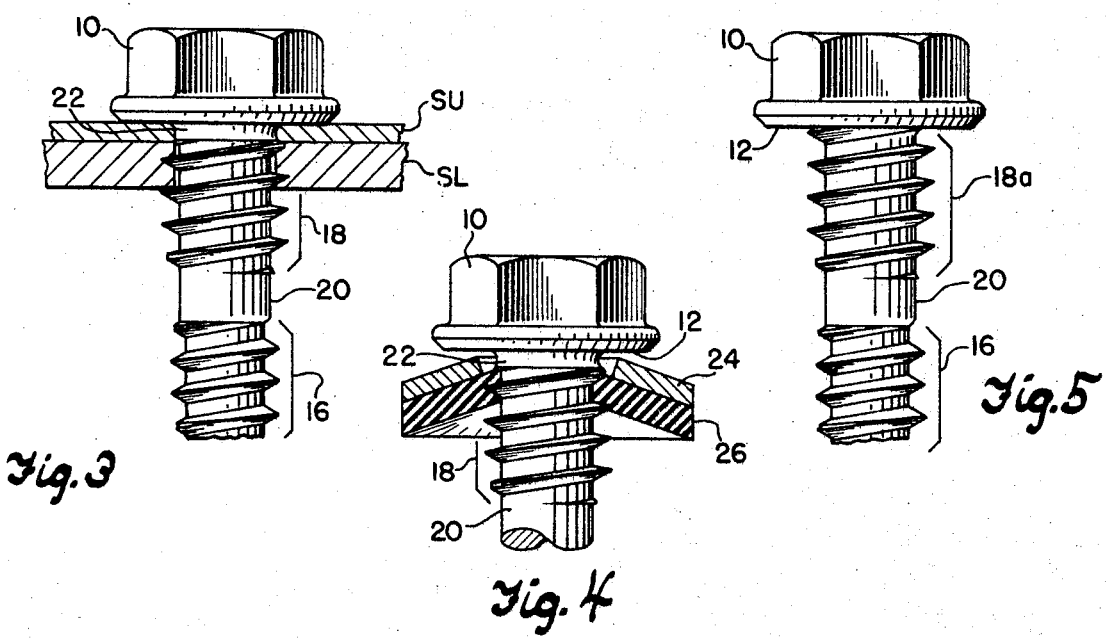
INVENTOR.
George L. Wieber
BY
His Att'ys

STITCHING SCREW

This invention relates to new and useful improvements in a self-drilling and stitching screw which is adapted to join together relatively thin sheets without a gap therebetween after successively drilling a hole in each sheet.

An object of the invention is to provide such a self-drilling and stitching screw having upper and lower thread sections separated by an intermediate unthreaded shank section so that after the drilling point penetrates the first sheet and during penetration of the second sheet, the upper sheet moves upwardly along the lower thread section to an idle or dwell area unthreaded shank section until the lower sheet moves up the lower thread section to juxtaposition with the upper sheet in the idling or dwell area and thereafter both sheets will be moved upwardly from the idling or dwell area along the upper thread section until the uppermost sheet is clamped against the clamping face of the screw head with the lower sheet gripped against the upper sheet.

Another object of the invention is to provide a self-drilling and stitching screw substantially of the above type wherein an upper unthreaded shank portion is disposed immediately adjacent the clamping face of the head to provide an additional idling area so that the screw may be rotated without affecting the uppermost sheet in this area while drawing the lower sheet into tighter contact therewith at the upper extremity of the upper thread section.

A still further object of the invention is to provide a self-drilling and stitching screw substantially of the above type which may also be utilized in fixing a combined cone type washer and sealing washer in stressed position against the clamping face of the screw head with the normal tendency for spring-back effecting a weather-proof seal.

The invention still further aims to provide a self-drilling and stitching screw as referred to above wherein the upper thread section serves as a chip breaker under the screw head minimizing damage to the sealing portion of the washer when screwed home.

The above and other objects of the invention will in part be obvious and will be hereinafter more fully pointed out.

In the accompanying drawing:

FIGURE 1 shows one form of the self-drilling and stitching screw in initial position before penetrating the sheets to be drawn together;

FIGURE 2 shows the position of the upper sheet in the idling area and with the lower sheet being moved up the lower thread section to become juxtaposed therewith;

FIGURE 3 shows the final position of the screw and the sheets;

FIGURE 4 is a fragmentary side elevation showing the screw with combined cone and sealing washers; and FIGURE 5 is a modified form of screw eliminating the uppermost unthreaded shank portion.

In the accompanying drawing and particularly with reference to FIGURES 1, 2 and 3 at this time, the screw is illustrated as including head 10 to which a suitable tool may be applied for operation thereof and a clamping face 12 therebeneath. The opposite end of the shank has a more-or-less conventional drilling point 14 which merges with a lower thread section 16. An upper thread section 18 is axially spaced from the lower thread section 16 by an unthreaded shank section 20 which provides an idling, dwell or parking area to be hereinafter referred to. Likewise, there may be provided a top unthreaded shank section 22 immediately adjacent the clamping face 12 providing an additional dwell area.

FIGURE 1 shows the position of the screw for initially drilling holes in sheets SU, SL which may be relatively thin as .015 inch. After the drilling extremity 14 has successively penetrated the sheets, the upper sheets SU will have moved up the threaded section 16 to the idling or parking area 20 and while in this position, the lower sheet SL will be moving up the lower thread section 16, as shown in FIGURE 2, for ultimate juxtaposition with the upper sheet SU in this area. From this position, both sheets will then be moved along the upper threaded section 18 to the final seated or clamped position of FIGURE 3. With the upper idling or dwell area 22, it is possible to obtain even tighter clamping pressure between the sheets. Thus, as the upper sheet, which may be relatively thinner than the lower sheet, reaches this area 22, rotation of the screw will have no thread effect on the upper sheet but the adjacent threads of the upper thread section 18 will serve to draw the lower sheet tightly thereagainst.

For most effective operation of the screw, it is desirable that the upper thread section 18 be of a slightly larger diameter than the lower thread section 16 but of similar pitch or lead. Thus, a deeper thread form of the threads in the upper thread section 18 operates to grip the sheets tightly together and to reduce stripping with resultant drill chip breaking characteristics. Further, the threads of the upper section 18 may be of the so-called buttress type with upper flank surfaces 19 which very nearly approach a perpendicular position with respect to the axis of the shank. With this type of flank surface, there is substantial underlying of the bottom surface of the lower sheet SL so as to increase resistance to stripping.

In FIGURE 4, the screw shown in FIGS. 1, 2 and 3, is illustrated as associated with a composite cone-shaped washer including a steel cone back-up washer 24 and a plastic sealing washer 26 bonded thereto. As the composite washer reaches a position for contact with the clamping face 12 of the screw head, the tendency is for the washer to flatten-out to some extent so that its inherent resiliency will react through the plastic washer to effect a weatherproof seal. The plastic material of the washer 26 may be of various types, such as neoprene. The screw of FIGURE 5 is similar to the screw shown in FIGS. 1 through 4 but with the threads of the upper thread section continuing to the clamping face of the screw head, thus eliminating the upper dwell area. Such a screw may be used with the sheets shown in FIGURES 1, 2 and 3 or with the washer shown in FIGURE 4.

In self-drilling screws, there has been the problem of the accumulation of drill chips under the screw head. It has found that the screw of the present invention eases this problem in that the threads of the upper thread section serve as chip breakers when the first or upper sheet rests in the intermediate dwell or parking area 20 and while the second or lower sheet is being drilled. This advantage is of particular importance when the screw is used with the composite washer shown in FIGURE 4. The reduction or elimination of drilling chips reduces the problem of the chips cutting into and destroying the plastic washer layer.

The screw of the present invention may also be used for fastening a sheet covering to various types of underlying structures such as dwelling of the cover sheets on the parking area while an underlying purlin or other support is being drilled and tapped. In such applications, the upper and lower threads should be related to afford continuity of thread engagement for full pull-up of the screw without exceeding pre-set torque of a driver or torsional strength of the screw core or root diameter.

While certain forms of the invention have been shown for purposes of illustration, it is to be clearly understood that various modifications may be made without departing from the scope of the invention as set forth in the appended claims.

I claim:

1. A drilling and stitching screw for drilling holes in relatively thin work sheets and securing the same together, and comprising a shank with a head having a work clamping face thereunder at one end thereof and a drilling point at the opposite end of said shank, the intermediate portion of said shank having upper and lower thread sections axially spaced from one another by an unthreaded shank portion, said lower threaded section being of pre-determined outer diameter with the threads of pre-determined pitch, said upper threaded section being of larger outer diameter than said pre-determined diameter, said unthreaded shank portion providing an idling or parking area for work sheets after holes are successively drilled in each work sheet with an upper sheet moving along the lower threaded section to the idling area and with a lower sheet subsequently moving along the lower threaded section to juxtaposition with the upper sheet in the idling area and with the upper and lower sheets then moving along the upper threaded section to clamped position at the clamping face of the screw head.

2. A drilling and stitching screw as claimed in Claim 1, wherein the threads of the upper thread section are of deeper thread form than the threads of the lower thread section and of similar pitch.

3. A drilling and stitching screw as claimed in Claim 1, wherein the larger diameter upper thread section includes upper thread flanks which approach a perpendicular to the shank axis for presenting increased underlying surface engagement with the lower sheet to resist stripping.

4. A drilling and stitching screw as claimed in Claim 3, wherein the upper thread section terminates short of the clamping face of the screw head to provide an additional dwell area permitting the lower sheet to be tightly drawn independently against the upper sheet.